United States Patent
Rao et al.

(10) Patent No.: US 7,114,105 B2
(45) Date of Patent: Sep. 26, 2006

(54) SYSTEM AND METHOD FOR SOFTWARE DOWNLOAD TO WIRELESS COMMUNICATION DEVICE

(75) Inventors: Srinivas Rao, San Diego, CA (US); Clifton Eugene Scott, San Diego, CA (US); Laxmi Rayapudi, San Diego, CA (US); Richard L. Prenoveau, La Jolla, CA (US)

(73) Assignee: Qualcomm, Inc., San Diego, CA (US)

( * ) Notice: Subject to any disclaimer, the term of this patent is extended or adjusted under 35 U.S.C. 154(b) by 187 days.

(21) Appl. No.: 10/726,939

(22) Filed: Dec. 3, 2003

(65) Prior Publication Data

US 2004/0194080 A1    Sep. 30, 2004

Related U.S. Application Data

(60) Provisional application No. 60/431,643, filed on Dec. 5, 2002.

(51) Int. Cl.
*G06F 11/00* (2006.01)
(52) U.S. Cl. ......................................... 714/38; 717/178
(58) Field of Classification Search ................ 717/178; 710/313; 714/38
See application file for complete search history.

(56) References Cited

U.S. PATENT DOCUMENTS

| | | | | |
|---|---|---|---|---|
| 6,157,975 A | * | 12/2000 | Brief et al. | 710/104 |
| 6,205,501 B1 | * | 3/2001 | Brief et al. | 710/100 |
| 6,678,760 B1 | * | 1/2004 | Brief | 710/52 |
| 2003/0065752 A1 | * | 4/2003 | Kaushik et al. | 709/220 |
| 2003/0188113 A1 | | 10/2003 | Grawrock et al. | 711/156 |
| 2004/0034785 A1 | | 2/2004 | Tai et al. | 713/189 |
| 2004/0098596 A1 | * | 5/2004 | Elteto et al. | 713/185 |

* cited by examiner

*Primary Examiner*—Dieu-Minh Le
(74) *Attorney, Agent, or Firm*—Philip R. Wadsworth; Sandip (Micky) S. Minhas; Abdollah Katbab

(57) ABSTRACT

To prevent errors in a PC pursuant to downloading new software to a wireless communication device through a USB port, when it is time to reset the wireless communication device, the registers in its processor that are associated with the USB are not reset, and the USB transceiver is maintained on. Also, the USB-related values in RAM are maintained during the reset, and flash memory is maintained in a normal mode. In this way, the wireless communication device does not appear to the PC to abruptly sever the connection at the USB port upon download completion, which might otherwise cause errors in applications running on the PC.

16 Claims, 1 Drawing Sheet

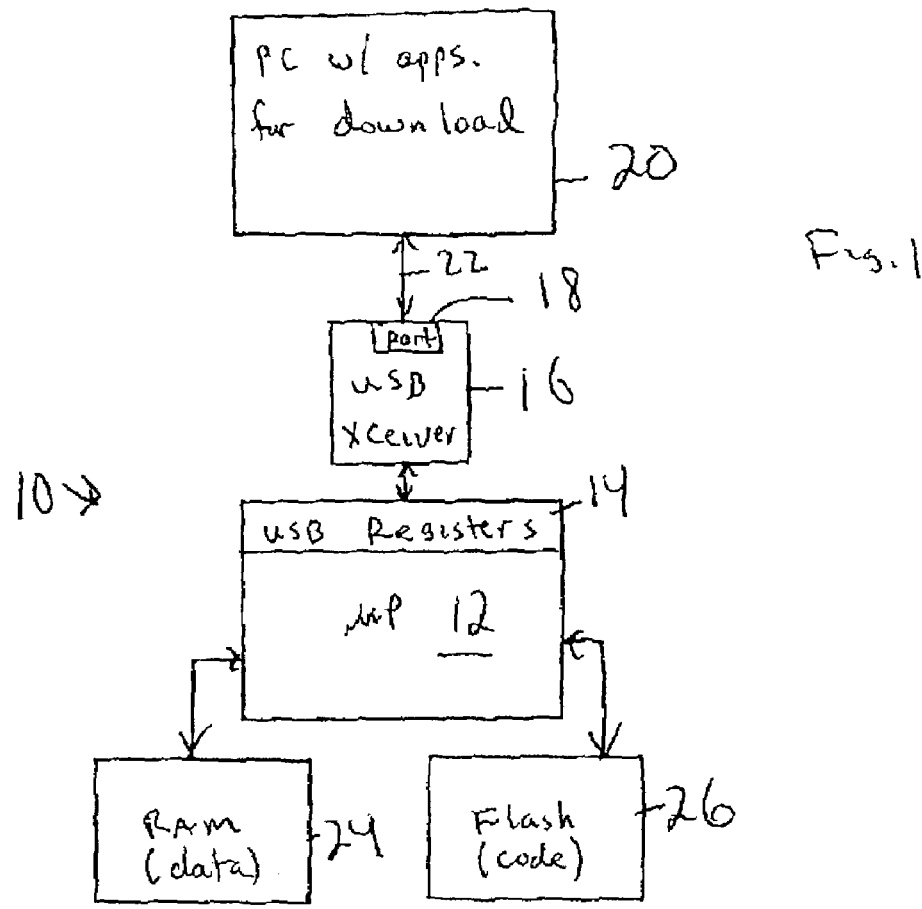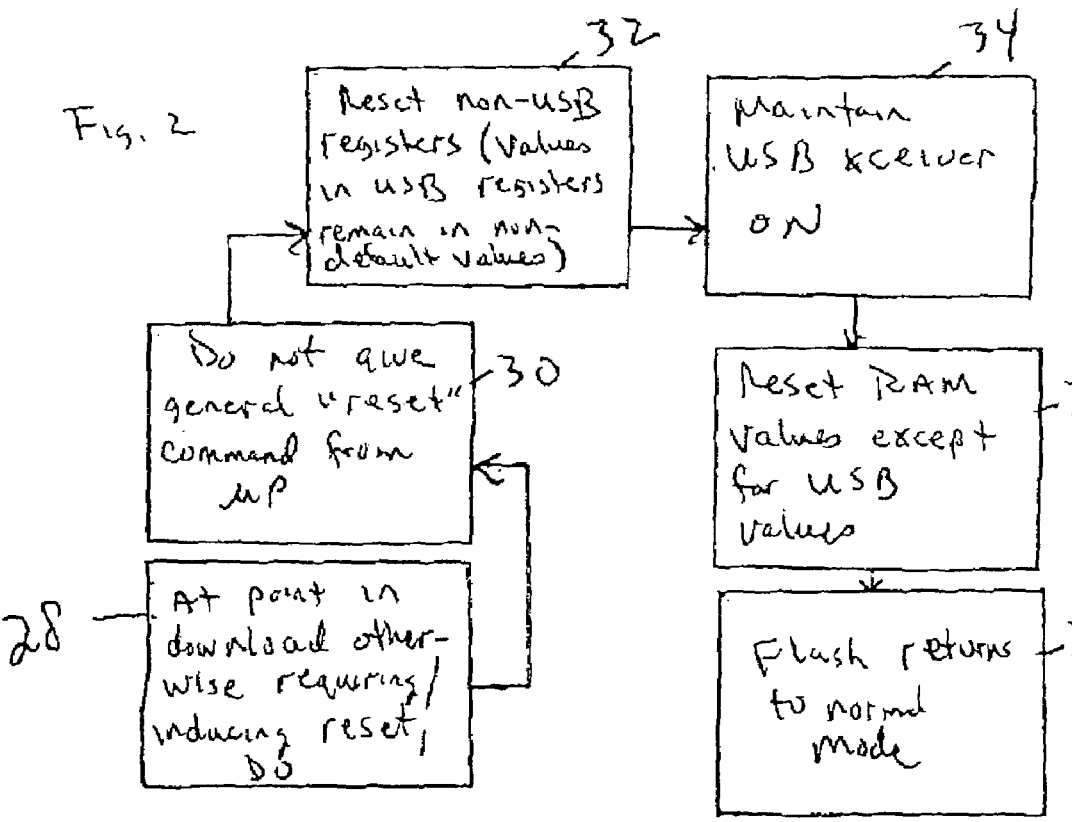

SYSTEM AND METHOD FOR SOFTWARE DOWNLOAD TO WIRELESS COMMUNICATION DEVICE

RELATED APPLICATIONS

The present Application for Patent claims priority to Provisional Application No. 60/431,643 entitled "System and Method for Software Download to Wireless Communication Device" filed Dec. 5, 2002, and assigned to the assignee hereof and hereby expressly incorporated by reference herein.

BACKGROUND

I. Field

The disclosed embodiments relate generally to wireless communication systems, and more particularly to downloading software to wireless communication devices.

II. Background

Wireless communication devices have become ubiquitous. Devices such as wireless telephones include so-called mobile station modems (MSM) that essentially are wireless communication computers which, like all digital computers, execute software to undertake the functions desired by the user.

Improvements in a wireless communication system sometimes entail changes to the software that is executed by the mobile devices in the system. For instance, changes to or additions to a system's base stations might require updated software be provided to wireless devices in the system.

Updated software can be provided to a wireless device from a computer such as a system computer operated by technical personnel by downloading the necessary software into the device through a wired or wireless path. In many devices, the incoming software is received through a wire that is connected to a personal computer (PC) having the new software. The wire terminates in a connector that mates with a Universal Serial Bus (USB) port on the wireless device.

At or near the end of a software download, many if not most MSMs execute a restart to use the new software. Among other things, a restart involves resetting processor registers and memory to default values. When a restart occurs, it appears to the downloading PC that the wireless device has been abruptly removed from the USB connection, despite the fact that the physical connection remains. While this may not be a problem from the wireless device side, it can cause problems for certain applications hosted by the PC, particularly the application attempting to complete the download process.

SUMMARY

A method for downloading software to a wireless communication device includes connecting a source of software to a universal serial bus (USB) port on the wireless communication device, and downloading the software from the source to the wireless communication device. When it is time to reset the device, the method undertakes the reset by executing one or more of the following: resetting registers in the processor of the wireless communication device except for USB-associated registers; maintaining the device's USB transceiver in an "on" state; resetting values in the device's RAM except for USB-associated values; maintaining a USB clock source associated with the device; and setting the flash memory of the device in a data mode. Alternatively, all of the above actions may take place during the present reset.

In another aspect, a wireless communication device includes a processor having registers, at least some of which are USB-associated registers containing pre-reset values. The device also has a USB transceiver communicating with the USB-associated registers of the processor and with a source of software external to the wireless communication device. Logic may be executed by the processor for resetting the wireless communication device under at least one reset condition (e.g., upon completion of software download) by resetting registers other than the USB-associated registers to their default value, maintaining pre-reset values in the USB-associated registers while the non-USB-associated registers are reset, and maintaining the USB transceiver energized during the reset.

In another aspect, a system includes a source of software, a universal serial bus (USB) port connected to the source of software, and a wireless communication device supporting the USB port. The wireless communication device includes a processor and a USB transceiver interconnecting the processor and the USB port. Means are provided for resetting registers in the processor except for USB-associated registers when a warm reset condition is satisfied.

BRIEF DESCRIPTION OF THE DRAWINGS

The details of the disclosed embodiments, both as to their structures and operations, can best be understood in reference to the accompanying drawings, in which like reference numerals refer to like parts, and in which:

FIG. 1 shows a block diagram of the present system; and

FIG. 2 shows a flow chart of the present logic.

DETAILED DESCRIPTION

Referring initially to FIG. 1, a wireless communication device is shown, generally designated 10, for facilitating computer data and/or voice communication in a radio access network. In one non-limiting implementation, the device 10 is a code division multiple access (CDMA) mobile station that may use cdma2000, cdma2000 1x, or cdma2000 1xEV-DO high data rate (HDR) principles, or other CDMA principles. In one non-limiting embodiment, the wireless communication device 10 is a mobile telephone made by Kyocera, Samsung, or other manufacturer that uses Code Division Multiple Access (CDMA) principles and CDMA over-the-air (OTA) communication air interfaces. The disclosed embodiments, however, apply to other mobile stations such as laptop computers, wireless handsets or telephones, data transceivers, or paging and position determination receivers. The wireless communication device 10 can be hand-held or portable as in vehicle-mounted (including cars, trucks, boats, planes, trains), as desired. However, while wireless communication devices are generally viewed as being mobile, it is to be understood that the present invention can be applied to "fixed" units in some implementations. Also, the disclosed embodiments apply to data modules or modems used to transfer voice and/or data information including digitized video information, and may communicate with other devices using wired or wireless links. Further, commands might be used to cause modems or modules to work in a predetermined coordinated or associated manner to transfer information over multiple communication channels. Wireless communication devices are also sometimes referred to as user terminals, mobile stations, mobile units, subscriber units, mobile radios or radiotelephones, wireless units, or simply as "users" and "mobiles" in some communication systems. It is to be understood that the disclosed embodiments apply equally to other types of wireless devices including without limitation GSM devices, time division multiple access (TDMA) systems, etc.

FIG. 1 shows that the wireless communication device 10 embodies a mobile station modem (MSM) that includes a processor 12 having processor registers, including some registers 14 that are used for universal serial bus (USB) operations. The USB registers 14 are connected to a USB transceiver 16 in accordance with principles known in the art, with the USB transceiver 16 communicating through a USB port 18 with a personal computer (PC) 20 that may contain software applications for download to the wireless communication device 10. The PC 20 may be connected to the USB port 18 of the wireless communication device 10 through a wire 22 that terminates in a connector configured for engaging the USB port 18 in accordance with USB principles known in the art. The wireless communication device 10 can also include random access memory (RAM) 24 for, e.g., storing non-program data, as well as memory such as flash memory 26 for, e.g., storing program code received from the PC 20.

FIG. 2 shows the logic of the present invention. Commencing at block 28, the logic is begun at a point in a download from the PC 20 that would otherwise require or induce a restart of the MSM, such as at completion of the download process (but perhaps before the download application in the PC 20 has finished executing). Block 30 indicates that the following logic replaces the conventional "reset" command that would otherwise be given by the processor 12 to precipitate, which is referred to as a "cold" restart.

Moving to block 32, the processor 12 functions to reset some or all of its registers that would ordinarily be reset in a cold reset operation, except for the USB registers 14. These registers maintain whatever pre-reset, non-default values they might contain. Block 34 indicates that the USB transceiver is not deenergized during the present reset, but rather is maintained in an "on" state throughout the reset.

Moreover, at block 36 some or all RAM values that would otherwise be reset in a "cold" reset are changed to their default values, with the exception of any USB-related values. These values remain unchanged. At block 38, the flash memory 26 is not, as is done conventionally, reset, but rather is returned by the processor 12 to its data (normal) mode. In this way, during the reset discussed herein the wireless communication device 10 advantageously appears to the PC 20 to remain connected and active at the USB port 18, as indeed it remains connected physically, until such time as all PC applications no longer require or expect to detect a device at the USB port. If desired, a USB clock source associated with the device can also be maintained.

While the particular SYSTEM AND METHOD FOR SOFTWARE DOWNLOAD TO WIRELESS COMMUNICATION DEVICE as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. § 112, sixth paragraph, unless the element is expressly recited using the phrase "means for" or, in the case of a method claim, the element is recited as a "step" instead of an "act".

We claim:

1. A method for downloading software to a device, comprising:
   connecting a source of software to a universal serial bus (USB) port communicating with the device;
   downloading the software from the source to the device; and
   resetting the device by undertaking at least one of: resetting registers in a processor of the device except for USB-associated registers; maintaining a USB transceiver associated with the device in an "on" state; resetting values in a RAM associated with the device except for USB-associated values; and setting a flash memory associated with the device in a data mode.

2. The method of claim 1, wherein prior to said resetting act, the USB-associated registers of the processor are configured with non-default values, and the method further comprises:
   resetting all registers in the processor except for the USB-associated registers; and
   maintaining the non-default values in the USB-associated registers during the resetting act.

3. The method of claim 1, further comprising maintaining the USB transceiver in the "on" state during the resetting act, wherein the USB transceiver communicates with the source of software through the USB port.

4. The method of claim 1, wherein prior to said resetting act, the USB-associated values in the RAM have non-default values, and the method further comprises:
   resetting RAM values to default values except for the USB-associated values; and
   maintaining the USB-associated values during the resetting act.

5. The method of claim 1, wherein the resetting act comprises all of: resetting all registers in a processor of the computer except for USB-associated registers; maintaining a USB transceiver associated with the computer in an "on" state; resetting values in a RAM associated with the computer except for any USB-associated values; and setting a flash memory associated with the computer in a data mode.

6. The method of claim 1, wherein the device is a CDMA wireless device.

7. A wireless communication device, comprising:
   at least one processor having registers, at least some of which are USB-associated registers containing pre-reset values;
   at least one USB transceiver configured for communicating with the USB-associated registers of the processor and with a source of software external to the wireless communication device; and logic executable by the processor for resetting the wireless communication device under at least one reset condition by:

resetting registers other than the USB-associated registers to their default value, maintaining the pre-reset values in the USB-associated registers at least while the non-USB-associated registers are reset, and maintaining the USB transceiver energized during the act of resetting the wireless communication device.

8. The wireless communication device of claim 7, wherein the reset condition is related to downloading of software from the source of software.

9. The wireless communication device of claim 7, further comprising at least one RAM communicating with the processor, the logic causing the processor during the resetting act to reset some RAM values to default values while maintaining USB-related non-default values.

10. The wireless communication device of claim 7, further comprising flash memory communicating with the processor, the logic causing the processor to configure the flash memory in a data mode during the act of resetting.

11. The wireless communication device of claim 7, wherein the wireless communication device is a CDMA device.

12. An apparatus for downloading software to a device, comprising:

means for connecting a source of software to a universal serial bus (USB) port communicating with the device;

means for downloading the software from the source to the device; and means for resetting the device by undertaking at least one of: means for resetting registers in a processor of the device except for USB-associated registers; means for maintaining a USB transceiver associated with the device in an "on" state; means for resetting values in a RAM associated with the device except for USB-associated values; means for and setting a flash memory associated with the device in a data mode.

13. An apparatus of claim 12, wherein prior to said means for resetting, the USB-associated registers of the processor are configured with non-default values, and the apparatus further comprises:

means for resetting all registers in the processor except for the USB-associated registers; and means for maintaining the non-default values in the USB-associated registers during the means for resetting act.

14. An apparatus of claim 12, further comprising means for maintaining the USB transceiver in the "on" state during the means for resetting, wherein the USB transceiver communicates with the source of software through the USB port.

15. An apparatus of claim 12, wherein prior to said means for resetting, the USB-associated values in the RAM have non-default values, and the apparatus further comprises:

means for resetting RAM values to default values except for the USB-associated values; and means for maintaining the USB-associated values during the means for resetting.

16. An apparatus of claim 12, wherein the means for resetting comprises: means for resetting all registers in a processor of the computer except for USB-associated registers; means for maintaining a USB transceiver associated with the computer in an "on" state; means for resetting values in a RAM associated with the computer except for any USB-associated values; and means for setting a flash memory associated with the computer in a data mode.

* * * * *